(12) United States Patent
Dairon et al.

(10) Patent No.: US 7,997,053 B2
(45) Date of Patent: Aug. 16, 2011

(54) ASSEMBLY OF A TRACTION VEHICLE AND A SOIL TREATMENT MACHINE

(75) Inventors: Michel Maurice Dairon, Pruille L'Eguille (FR); José Alain Loyer, Mansigne (FR)

(73) Assignee: SAS Dairon, Mulsanne (FR)

( * ) Notice: Subject to any disclaimer, the term of this patent is extended or adjusted under 35 U.S.C. 154(b) by 0 days.

(21) Appl. No.: 12/645,573

(22) Filed: Dec. 23, 2009

(65) Prior Publication Data

US 2010/0170686 A1 Jul. 8, 2010

(30) Foreign Application Priority Data

Jan. 6, 2009 (FR) .................................... 09 50042

(51) Int. Cl.
*A01D 34/53* (2006.01)
(52) U.S. Cl. .......................................... 56/249; 56/15.8
(58) Field of Classification Search ..................... 37/468, 37/466, 403–409; 172/78, 111, 98, 99, 117, 172/125, 305, 508, 739, 743; 56/10.4, 15.1–15.9, 56/194–206, 6, 7, 14.9, 249, 255; 280/124.141, 280/124.179, 124.136, 124.111, 124.113
See application file for complete search history.

(56) References Cited

U.S. PATENT DOCUMENTS

| | | | |
|---|---|---|---|
| 3,913,681 A | 10/1975 | Lincoln et al. | |
| 4,332,299 A * | 6/1982 | Parks et al. | ...................... 172/98 |
| 6,125,619 A * | 10/2000 | Wolff | .............................. 56/14.9 |
| 6,584,756 B2 * | 7/2003 | Buss | ............................... 56/15.6 |
| 7,124,563 B2 * | 10/2006 | Shibata et al. | ................... 56/203 |
| 7,467,802 B2 * | 12/2008 | Peng et al. | ............. 280/124.103 |
| D633,112 S | 2/2011 | Dairon et al. | |

FOREIGN PATENT DOCUMENTS

| | | |
|---|---|---|
| EP | 0 759 267 A1 | 2/1997 |
| EP | 1 062 857 A1 | 12/2000 |
| EP | 1 570 722 A1 | 9/2005 |

* cited by examiner

*Primary Examiner* — Robert Pezzuto
(74) *Attorney, Agent, or Firm* — Leydig, Voit & Mayer, Ltd.

(57) ABSTRACT

An assembly of a traction vehicle and a soil treatment machine, such as a scrub clearing-plant shredding machine, includes a connecting mechanism including at least one articulated connecting rod of the same length as two other connecting rods forming a deformable parallelogram that maintains a parallelogram configuration, on either side of a closing plane, during vertical upward and downward movements of the soil treatment machine relative to a support arm.

10 Claims, 11 Drawing Sheets

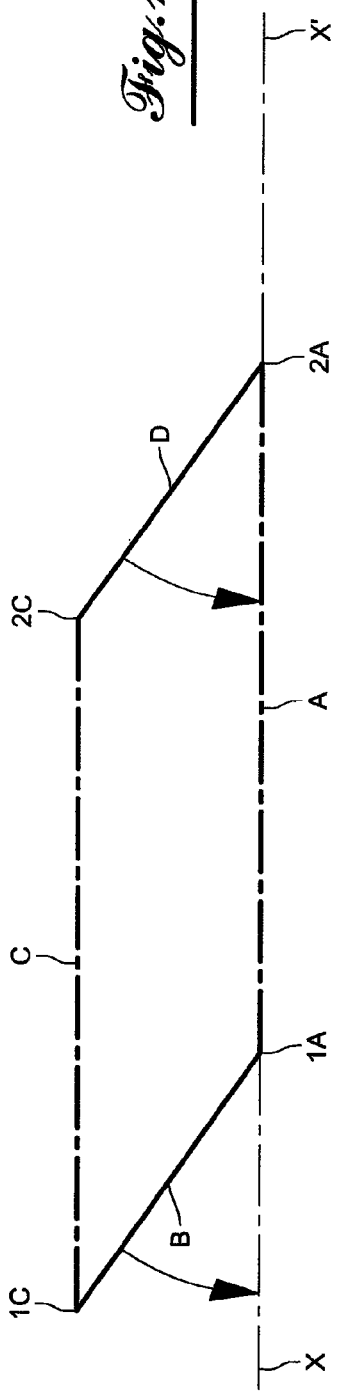
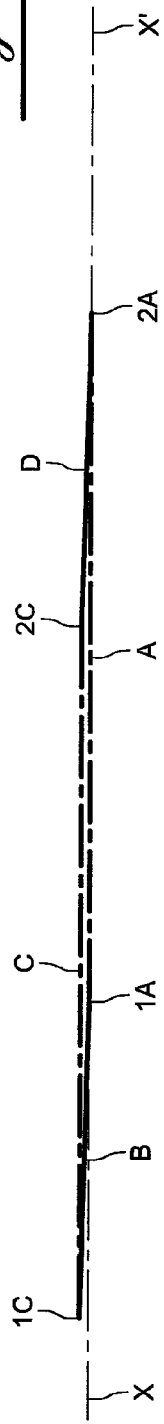
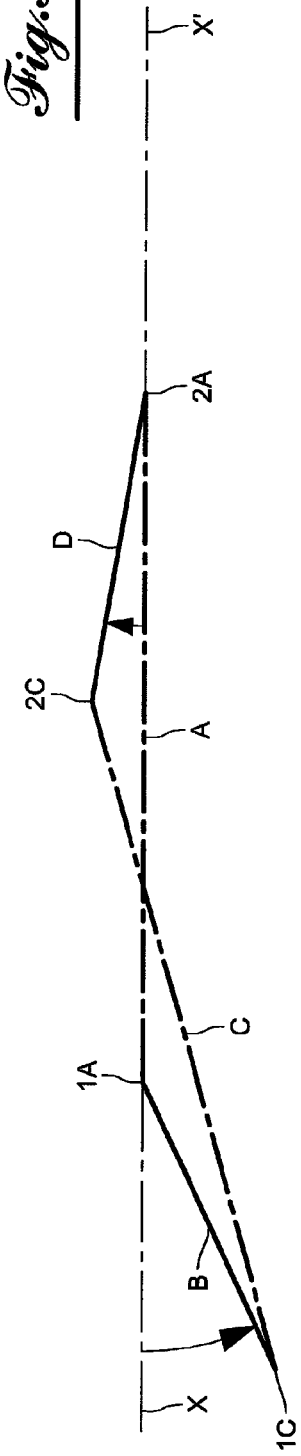

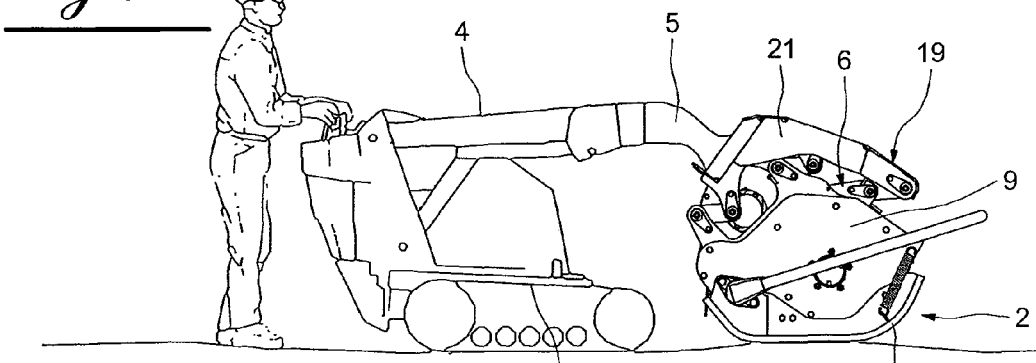
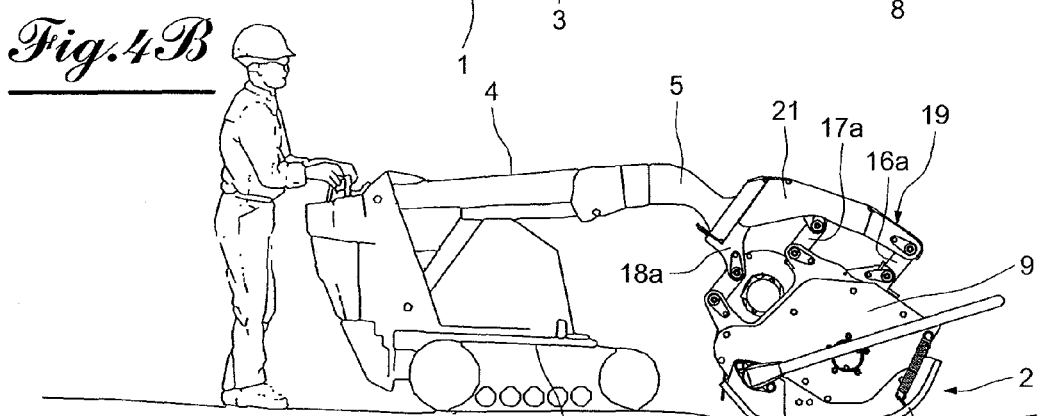
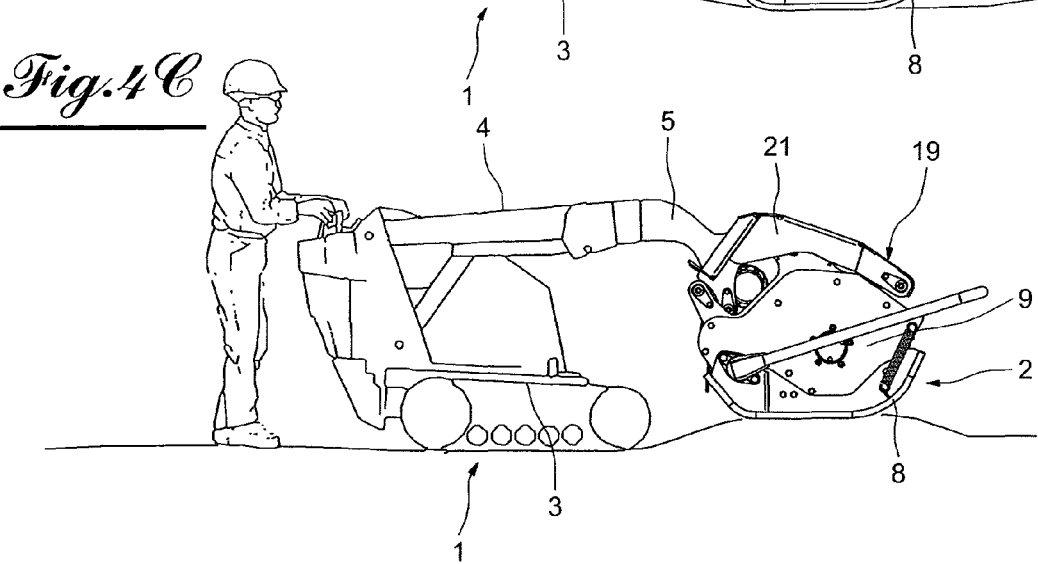

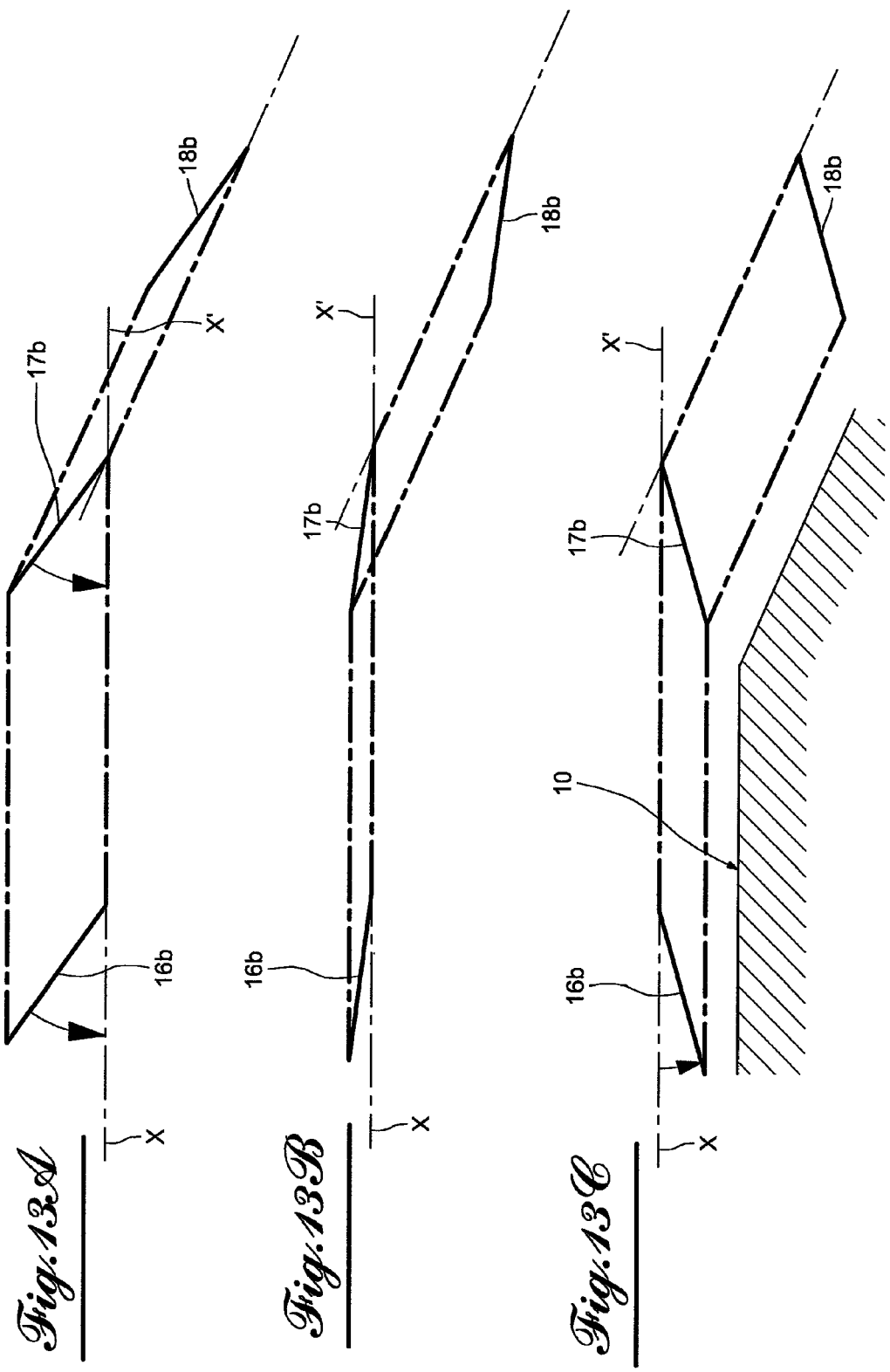

ASSEMBLY OF A TRACTION VEHICLE AND A SOIL TREATMENT MACHINE

FIELD OF THE INVENTION

The present invention concerns an assembly of a traction vehicle and a soil treatment machine, such as a scrub clearing-plant crushing machine.

It also targets a soil treatment machine, such as a scrub clearing-plant crushing machine able to be hitched to a traction vehicle.

BACKGROUND

Such an assembly is known according to which the traction vehicle, of the type with motor tracks and steered by a person behind the vehicle, comprises a fixed rigid arm protruding in front of the vehicle and at the end of which is freely suspended the soil treatment machine which can move, while remaining in contact on the ground by its own weight, in the forward direction by the thrust exerted by the traction vehicle on the soil treatment machine.

The suspension of the soil treatment machine at the end of the support arm is done via a connecting mechanism allowing the machine to move vertically in relation to the support arm so that it follows the height differences of the soil, due to unevenness thereof.

This connecting mechanism is formed by at least one pair of articulated connecting rods of the same length constituting a deformable parallelogram thereby allowing the machine to be raised or lowered vertically in relation to the support arm during movement of the machine on irregular ground.

FIG. 1 diagrammatically illustrates a deformable parallelogram with sides parallel in two pairs A, C and B, D, whereof the two small parallel sides B, D respectively constitute the two connecting rods hingedly connected by their ends in 1C, 2C and 1A, 2A to the support arm of the traction vehicle and to the hood of the soil treatment machine. In this figure, the soil treatment machine occupies a low position in relation to the fixed support arm. This parallelogram deforms while remaining open above the axis X-X' passing through the lower articulations 1A, 2A of the connecting rods B, D to the hood of the soil treatment machine for corresponding amplitudes of vertical displacement of the machine relative to the support arm.

FIG. 2 shows the situation according to which the parallelogram is closed during a determined amplitude of the upward movement of the machine relative to the support arm, i.e. the two connecting rods B, D are essentially aligned along the axis X-X' called closing axis of the parallelogram.

When the soil treatment machine moves further upward relative to the arm of the traction vehicle, because the sums of the two adjacent sides A, B and C, D of the parallelogram are equal, the parallelogram is broken, i.e. the two connecting rods B and D are no longer parallel due to the fact that the pivoting of the articulation point 1C of the connecting rod B around the articulation point 1A below the closing line X-X' causes the articulation point 2C of the connecting rod D to rise around the articulation point 2A as illustrated in FIG. 3. In the position illustrated in FIG. 3, the two connecting rods B and D block any additional upward movement by the treatment machine relative to the support arm, able to cause breaking of the articulations of the connecting rods and when the soil treatment machine again lowers in relation to the support arm from the position illustrated in FIG. 3, the pivoting of the connecting rods B, D toward the closing line X-X' passes by a hard spot once again risking breaking the articulations of the connecting rods.

Thus, the mechanism with two articulated connecting rods making it possible to suspend the soil treatment machine from the support arm of the traction vehicle limits the displacement height of the treatment machine relative to the support arm according to the irregularities of the soil, unless one provides longer connecting rods, to the detriment of the compactness of the assembly formed by the machine and the support arm. Moreover, the suspension mechanism of the connecting rods does not ensure good vertical guiding of the machine relative to the support arm.

SUMMARY OF THE INVENTION

The present invention aims to offset the abovementioned drawbacks by proposing a suspension mechanism for a soil treatment machine at the end of a support arm of a traction vehicle using relatively short connecting rods while ensuring good guidance of the vertical displacement of the machine relative to the support arm and while being a structure which is not overly bulky and is therefore compact.

To this end, according to the invention, the assembly of a traction vehicle and a soil treatment machine, such as a scrub clearing-plant crushing machine able to move on the ground via the traction vehicle while being freely suspended at the end of a support arm fixed to the traction vehicle via a connecting mechanism to at least one pair of articulated connecting rods of the same length constituting a deformable parallelogram allowing the machine to be raised or lowered vertically in relation to the support arm so as to follow the unevenness of the soil during movement of the machine on the ground, is characterized in that the connecting mechanism comprises at least one additional articulated connecting rod, of the same length as the other two connecting rods and parallel to these two connecting rods so as to allow the parallelogram to deform while keeping a parallelogram configuration on either side of the closing plane of the parallelogram during vertical upward and downward movements of the machine relative to the support arm.

Preferably, the connecting mechanism comprises two pairs of articulated connecting rods of the same length respectively constituting two deformable parallel parallelograms and at least one third pair of additional articulated connecting rods, of the same length as the connecting rods of the other two pairs and parallel to the connecting rods of these latter pairs so as to allow the parallelograms to deform while each keeping a parallelogram configuration on either side of the closing plane of the parallelogram during vertical upward and downward movements of the machine relative to the support arm.

Advantageously, the two connecting rods of the third pair are arranged in two planes respectively containing the two deformable parallelograms.

The two articulated connecting rods constituting a deformable parallelogram and one of the additional connecting rods on one hand, and the other two articulated connecting rods constituting the other deformable parallelogram and the other additional connecting rod on the other hand, are arranged symmetrically to a vertical plane parallel to the forward direction of the traction vehicle.

This vertical plane of symmetry of the pairs of rods contains the longitudinal axis of the traction vehicle.

The articulations of the connecting rods on one hand to the support arm and on the other hand to the hood of the machine are not aligned in a same plane.

According to one embodiment, the connecting rods constituting each deformable parallelogram and each additional connecting rod are connected to the support arm and the hood of the machine by ball and socket joints also allowing displacement of the machine transverse to its direction of movement.

According to another embodiment, the connecting rods constituting each parallelogram and each additional connecting rod are hingedly connected on one hand to the support arm along three horizontal joint pins transverse to the direction of movement of the traction vehicle and on the other hand to the hood of the machine along three horizontal joint pins transverse to the direction of movement of the traction vehicle.

The support arm can have a lower profile at least partially corresponding essentially to the profile of the non-flat upper wall of the hood of the machine and the articulations of the connecting rods to the hood of the machine are arranged on the outer face of the upper wall of the hood at different locations of this hood from front to back such that in the highest position of the machine relative to the support arm, the latter at least partially fits the upper wall of the hood.

Advantageously, the connecting rods are hingedly mounted to the hood of the machine respectively in fork joints integral with the outer face of the non-flat upper wall of this hood.

The connecting rods of a same pair are twinned by two hollow cylindrical parallel shafts and pivotingly fastened to their respective fork joints and to two vertical side walls of the support arm by cylindrical shafts passing through the fork joints, the side walls and the hollow cylindrical twinning axles of the connecting rods while being made integral with the fork joints and walls.

The soil treatment machine is removably fastened to the support arm of the traction vehicle and in front of the vehicle, which is capable of pushing the soil treatment machine forward or pulling it backward.

The soil treatment machine comprises two lateral feet ensuring movement of the machine by sliding on the ground.

Advantageously, the hood of the treatment machine comprises two stops limiting the pivoting of at least one of the connecting rods to the high and low positions of the machine, respectively, relative to the support arm.

The invention also pertains to a soil treatment machine, such as a scrub clearing-plant crushing machine, which can be freely suspended at the end of a support arm fixed to a traction vehicle via a suspension mechanism with at least two articulated connecting rods constituting a deformable parallelogram and which is characterized in that it comprises at least three fork joints integral with the outer face of the non-flat upper wall of the hood of the machine and designed to support two hinge pins respectively of the two connecting rods constituting the deformable parallelogram and a hinge pin of at least one additional connecting rod parallel to the other two connecting rods, the hinge pins extending along a direction transverse to the direction of movement of the machine.

BRIEF DESCRIPTION OF DRAWING FIGURES

The invention will be better understood, and other aims, characteristics, details and advantages thereof will appear more clearly during the following explanatory description done in reference to the appended drawings provided solely as an example illustrating one embodiment of the invention and in which:

FIGS. 1 to 3 diagrammatically illustrate a mechanism with two articulated connecting rods constituting a deformable parallelogram according to the prior art making it possible to suspend a machine from a support arm of a traction vehicle;

FIGS. 4A to 4C are side views of a traction vehicle and soil treatment machine assembly according to the invention;

Figure 12A:
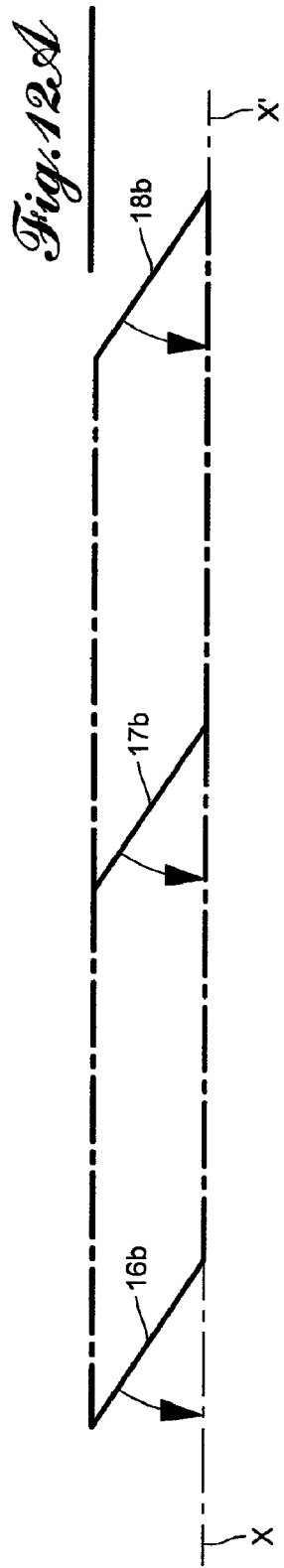
Figure 12B:
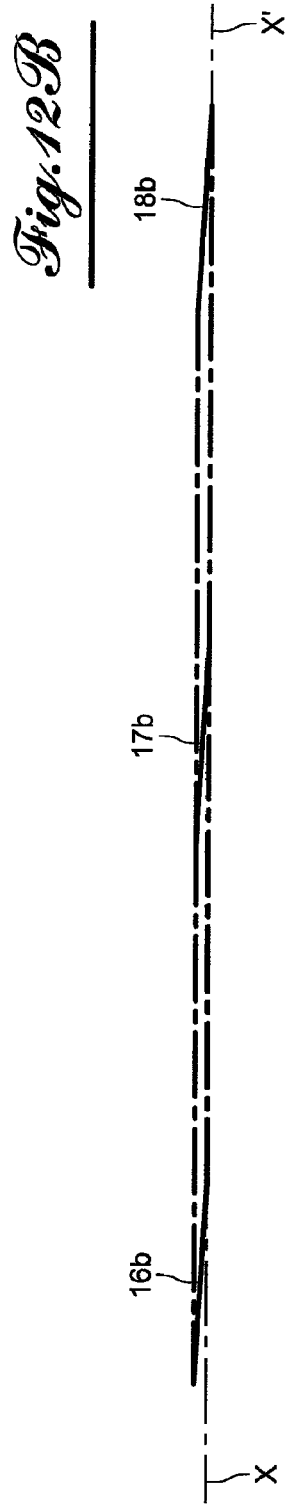
Figure 12C:
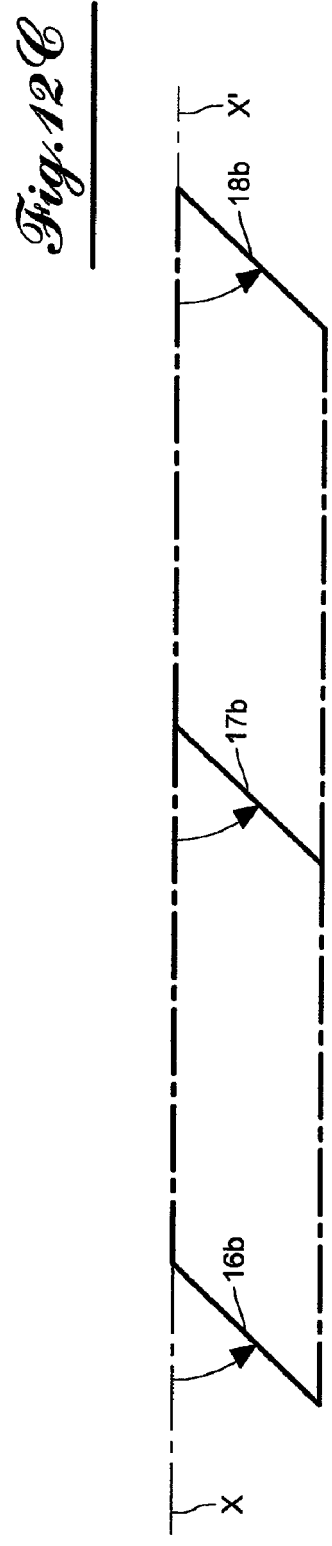

FIGS. 12A to 12C diagrammatically illustrate the deformation of the parallelogram of the suspension rod mechanism of the invention; and FIGS. 13A to 13C diagrammatically illustrate the connecting rod suspension mechanism of the invention used with a hood of the soil treatment machine, said hood having a non-flat profile.

FIGS. 4A to 4C illustrate a traction vehicle 1 to the front portion of which is hitched a soil treatment machine 2, for example such as a scrub clearing and/or plant crushing machine.

DETAILED DESCRIPTION

The traction vehicle 1 can be of the motor track 3 type able to be driven by a person located behind the vehicle. Thus, the vehicle 1 moves in front of the person driving it.

The vehicle 1 comprises a fixed arm 4 integral with the frame of the vehicle 1. "Fixed arm" refers to an arm which is immobile in relation to the vehicle 1 during the operation of the vehicle assembly 1 and assembly 2, but this arm can be mounted pivotingly to the vehicle in order to be adjusted to a fixed position determined before use of this assembly.

The fixed arm 4 extends along the longitudinal axis of the vehicle 1, protruding in front of the vehicle, and can occupy an approximately horizontal position. The arm 4 comprises a front end portion curved downward 5 from which the soil treatment machine 2 is freely suspended via a connecting rod mechanism 6 allowing the machine 2 to follow vertically, relative to the support arm 5, the unevenness or level differences in the ground on which the machine 2 moves under the forward thrust exerted by the vehicle 1. Thus, the machine 2 is suspended to the support arm 5 while resting by its own weight on the ground. FIG. 4A shows that the machine is raised slightly upward in relation to the support arm 5 by a swell having a low height from the ground whereas FIG. 4B shows that the machine 2 is lowered relative to the support arm 5 by moving into a hollow area in the ground. In FIG. 4C, the machine 2 is raised to its maximum height relative to the support arm 5 by a boss of the ground which is relatively high. The machine 2 can therefore follow, by the suspension mechanism 6 from the arm 5, the differences in the height of the ground without the person driving the vehicle 1 needing to vary the height of the fastening arm 4.

As emerges from FIGS. 5 to 11, the machine 2 comprises a hood 7 open from the bottom and which can rest on the ground via two lateral sliding blocks 8 fastened respectively to the lower ends of the two side walls 9 of the hood 7.

The two side walls 9 and the upper wall 10 of the hood 7 thereby define an internal space in which the soil treatment tools (not shown) are housed and which can consist of scrub clearing and/or crushing tools when the machine 2 is a scrub clearing-plant crushing machine. The upper wall 10 of the hood 7 has a non-flat external profile, i.e., as better visible in FIGS. 5 to 10, it comprises a first front flat wall portion 10a inclined downward extended toward the vehicle 1 by a second essentially horizontal flat wall portion 10b itself extended by a portion of rear flat wall 10c inclined downward and arranged facing the vehicle 1.

A motor means 11, such as a hydraulic motor, is fastened to one of the side walls 9 of the hood 7 of the machine 2 and makes it possible to drive the tools for working the soil housed in the hood 7 via a suitable drive mechanism, for example of the chain type, connecting the shaft of the motor means 11 to at least one drive shaft of the work tools.

The machine 2 is provided with a rigid hoop 12 designed to cut shrubs down to the ground during movement of the machine 2 to crush the shrubs when this machine is a crusher. The hoop 12 comprises two parallel arms 13 pivotably mounted to the hood 7 of the machine 2 along a pivot axis Y-Y' transverse to the direction of movement of the machine 2 and against the elastic return force exerted by two helical traction springs 14, each inserted between the corresponding arm 13 and the corresponding sliding block 8. The hoop 12 also comprises a bar 15 extending transversely to the direction of movement of the machine 2 and integral with the two ends of the arms 13 opposite the pivot axis Y-Y'. The bar 15 extends in front of the machine 2 and, during movement of this machine, can bear on the shrubs, which causes the raising of the hoop 12 against the return force of the traction springs 14 which exert a bending stress on the shrubs so that they then penetrate the hood 7 to be crushed by the crushing tools.

According to the invention, the suspension mechanism 6 comprises three pairs of connecting rods 16, 17, 18 of the same length articulated between the upper wall 10 of the hood 7 of the machine 2 and a bracket 19 removably fastened overhanging the end portion 5 of the fixed arm 4.

The connecting rods 16a, 16b; 17a, 17b and 18a, 18b respectively of the three pairs 16, 17, 18 are parallel to each other and, preferably, the connecting rods 16a, 17a, 18a situated on a same side extend in a plane perpendicular to the pivot axis Y-Y' of the hoop 12 transverse to the direction of movement of the machine 2 while the connecting rods 16b, 17b, 18b situated on a same opposite side extend in a same plane parallel to the plane containing the connecting rods 16a, 17a, 18a. Furthermore, the lateral connecting rods 16a, 17a, 18a and the other lateral connecting rods 16b, 17b, 18b are arranged symmetrically to the median plane of the machine 2 parallel to the two planes containing these lateral connecting rods and which is the median vertical plane containing the longitudinal axis of the vehicle 1 when the machine 2 is hitched to this vehicle.

Thus, the three pairs of connecting rods 16, 17, 18 constitute, two by two, two parallel deformable parallelograms allowing the machine 2 to be raised or lowered vertically in relation to the bracket 19 and to the support arm 4 such that the machine 2 can follow the unevenness or irregularities of the ground on which it moves by sliding via its blocks 8.

In other words, two of the connecting rods 16a, 17a of the two pairs 16, 17 constitute a deformable parallelogram on one side while the other two connecting rods 16b, 17b of the two pairs 16, 17 constitute, on the opposite side, a deformable parallelogram parallel to that formed by the connecting rods 16a, 17a, while the connecting rods 17a, 18a of pairs 17, 18 constitute a deformable parallelogram on one side while the other two connecting rods 17b, 18b constitute an opposite deformable parallelogram. Likewise, the connecting rods 16a, 18a of the pairs 16, 18 constitute a deformable parallelogram on one side while the connecting rods 16b, 18b constitute, on the opposite side, another deformable parallelogram.

This configuration of deformable parallelograms is illustrated in FIG. 12A, which is a diagrammatic side view illustrating only the articulated connecting rods 16b, 17b, 18b of pairs 16, 17, 18. According to this configuration, the articulations of the connecting rods 16b, 17b, 18b to the bracket 19 are situated in a same plane while the articulations of these connecting rods to the hood 7 of the machine 2 are situated in a same plane parallel to the plane containing the opposite articulations, although a non-aligned placement configuration of these articulations is preferably provided, as will be described later. The position of the connecting rods 16b, 17b, 18b in FIG. 2A corresponds to the lowest position of the machine 2 relative to the fixed support bracket 19. When the machine 2 rises toward the fixed bracket 19, under the action of a swell of the ground on which the machine engages, the open parallelograms defined by the connecting rods 16b, 17b, 18b of FIG. 12A deform in the trigonometric direction indicated by the arrows in FIG. 12A by corresponding pivoting of the connecting rods 16b, 17b, 18b which can go as far as the closing of these parallelograms, as illustrated in FIG. 12B which shows that the connecting rods 16b, 17b, 18b are situated approximately in the closing axis X-X' of the parallelograms. Of course, the closing of the opposite parallel parallelograms defined by the connecting rods 16a, 17a, 18a also occurs simultaneously, such that all of the connecting rods of the three pairs 16, 17, 18 are situated approximately in a same closing plane.

When the machine 2 continues to be moved upward relative to the fixed bracket 19 from the closed position of the parallelograms of FIG. 12B, the connecting rods 16b, 17b, 18b like the connecting rods 16a, 17a, 18a can continue to pivot in the trigonometric direction as indicated by the arrows in order to go beyond the closing plane containing the axis X-X' of these parallelograms as illustrated in FIG. 12C, so as to allow the different connecting rods to keep a deformable parallelogram configuration, FIG. 12C showing a position of the connecting rods corresponding to a maximum raised position of the machine 2 in relation to the fixed support bracket 19.

The suspension mechanism of the invention can be considered as comprising a third pair of connecting rods, for example the connecting rods 18a, 18b, which prevent the parallelograms constituted by the other two pairs of connecting rods 16a, 16b; 17a, 17b from breaking on either side of the closing plane of the parallelograms containing the axis X-X'. Thus, the connecting rod mechanism of the invention allows the machine 2 to follow the height differences in the ground while keeping a configuration of inverted open parallelograms above and below the closing plane of these parallelograms. This has the advantage that one can, by this mechanism, obtain a large displacement amplitude in height of the machine 2 relative to the fixed support bracket 19 by using relatively short connecting rods 16a, 16b; 17a, 17b; 18a, 18b leading to a compact suspension mechanism.

According to the preferred embodiment, the connecting rods 16a, 16b; 17a, 17b; 18a, 18b of the pairs 16, 17, 18 are hingedly articulated on one hand to the upper wall 10 of the hood 7 along three horizontal hinge pins A1, A2; A3, A4; A5, A6 and transverse to the direction of movement of the vehicle 1 and on the other hand to the support bracket 19 along three horizontal axes B1, B2; B3, B4; B5, B6 and transverse to the direction of movement of the vehicle 1. Moreover, the hinge pins A1, A2; A3, A4; A5, A6 of the connecting rods to the wall 10 of the hood 7 are not aligned in a same plane, likewise for the hinge pins B1, B2; B3, B4; B5, B6 of the connecting rods to the bracket 19.

The support bracket 19 comprises a rigid upper wall forming a cover 20 under which two side walls 21 extend vertically. The walls 20, 21 of the bracket 19 are made integral with a rigid rear wall 22 whereof the upper and side edges comprise curved rims 23 configured so as to receive, by interlocking, a rigid plate, not shown, integral with the end portion 5 of the fixed arm 4 in order to make the bracket 19 integral with the arm 4.

The side walls 21 of the bracket 19 have a lower profile at least partially corresponding essentially to the profile of the non-flat upper wall 10 of the hood 7 of the machine 2.

The pins A1, A2; A3, A4; A5, A6 are fastened on the outer face of the upper wall 10 of the hood 7 at different locations of this hood from front to back. More precisely, the pin A1, A2 of the connecting rods 16a, 16b is fastened to the front wall 10a of the hood 7, the pin A3, A4 of the connecting rods 17a, 17b is fastened to the intermediate wall 10b of the hood 7 while the pin A5, A6 of the connecting rods 18a, 18b is fastened to the rear wall 10c of the hood 7.

Preferably, the pins A1, A2; A3, A4; A5, A6 are fastened respectively to fork joints 24, 25, 26 integral with the outer faces of the front, middle and rear walls 10a, 10b, 10c of the hood 7.

The pins B1, B2; B3, B4; B5, B6 of the pairs of connecting rods 16, 17, 18 are fastened to the side walls 21 of the support bracket 19. More precisely, the pin B1, B2 of the connecting rods 16a, 16b is fastened between the two side walls 21 of the bracket 19 in front of the latter part, while the pins B3, B4; B5, B6 of the connecting rods 17a, 17b; 18a, 18b are respectively fastened to two pairs of blocks 27, 28 forming fork joints integral with the two side walls 21 of the bracket 19.

Thus, considering that the bracket 19 is fixed relative to the vertically mobile machine 2, the hinge pins A1, A2; A3, A4; A5, A6 of the pairs of connecting rods 16, 17, 18 are mobile in relation to the fixed pins B1, B2; B3, B4; B5, B6 in order to ensure pivoting of the connecting rods around these fixed hinge pins during vertical displacement of the machine 2.

FIGS. 13A to 13C diagrammatically illustrate the deformation of the parallelogram formed by the two articulated connecting rods 16b, 17b and, as a result, of the parallel parallelogram formed by the other two connecting rods 16a, 17a, under the action of each additional connecting rod 18b, 18a on either side of the closing plane of each parallelogram containing the axis X-X' with the connecting rods 16a, 17a, 18a; 16b, 17b, 18b having their articulations on one hand to the bracket 19 and on the other hand to the hood 7 of the machine not aligned, in order to allow the bracket to adapt to the profile of the non-flat upper wall 10 of the hood 7 of the machine 2, profile symbolized in FIG. 13C.

These figures also show that the presence of each additional connecting rod 18a, 18b allows the corresponding deformable parallelogram to deform while keeping its parallelogram configuration on either side of the closing plane.

Figure 6:
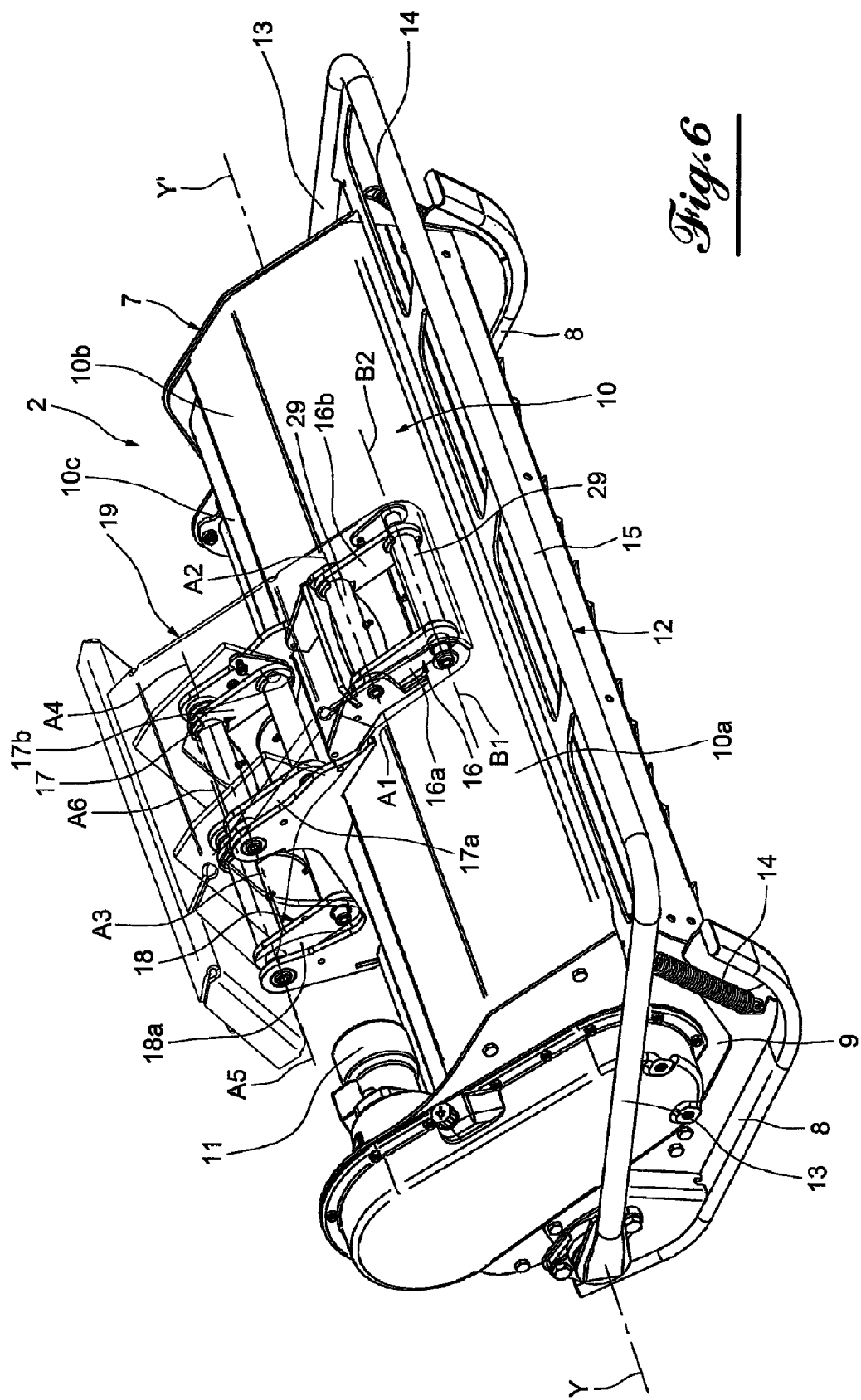
FIG. 6 is a view similar to that of FIG. 5 and illustrating, by transparency, the suspension mechanism of the machine with a support arm according to the invention.
Figure 9:
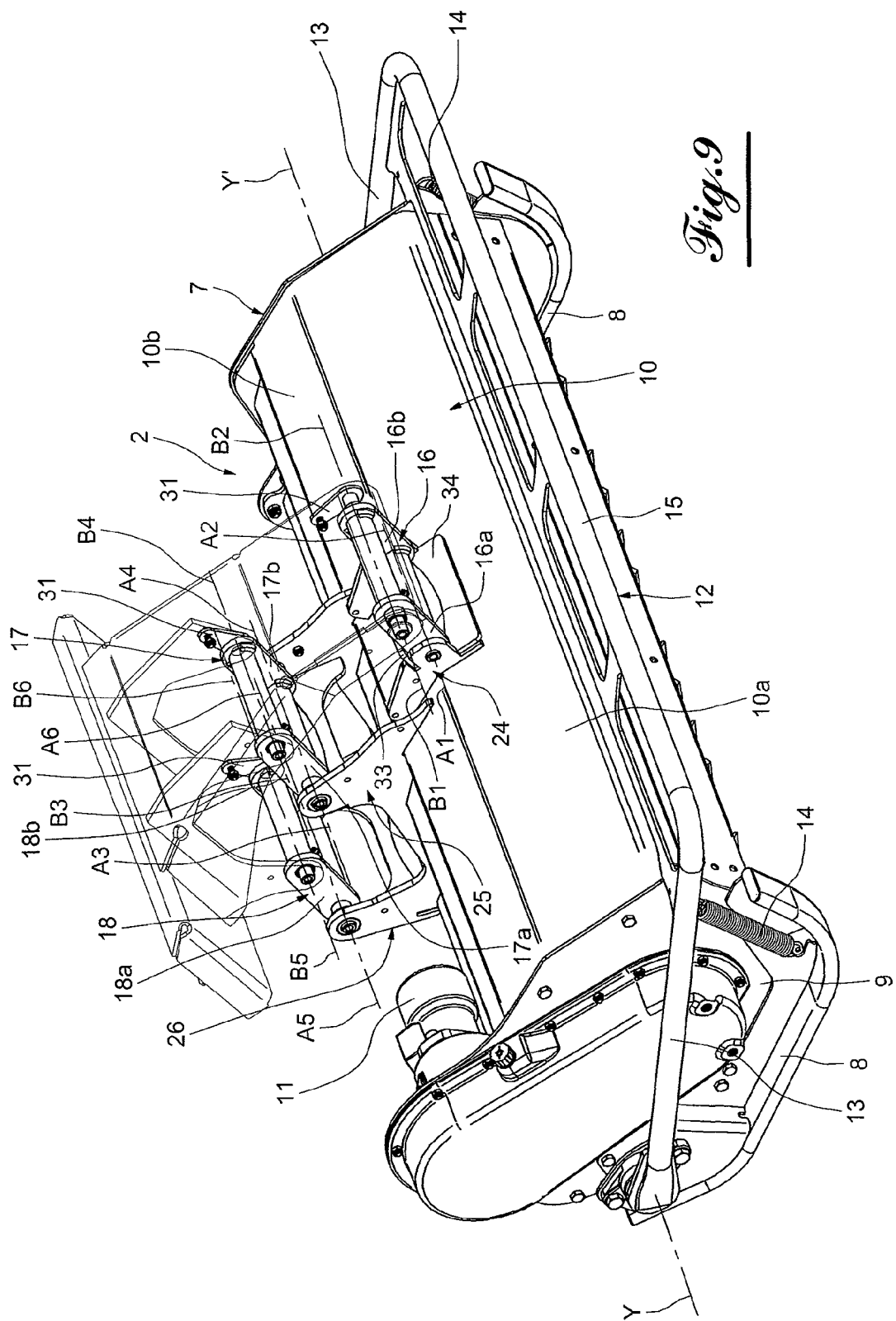
FIG. 9 illustrates the machine of FIG. 8 showing, by transparency, the suspension mechanism of the invention.
Figure 11:
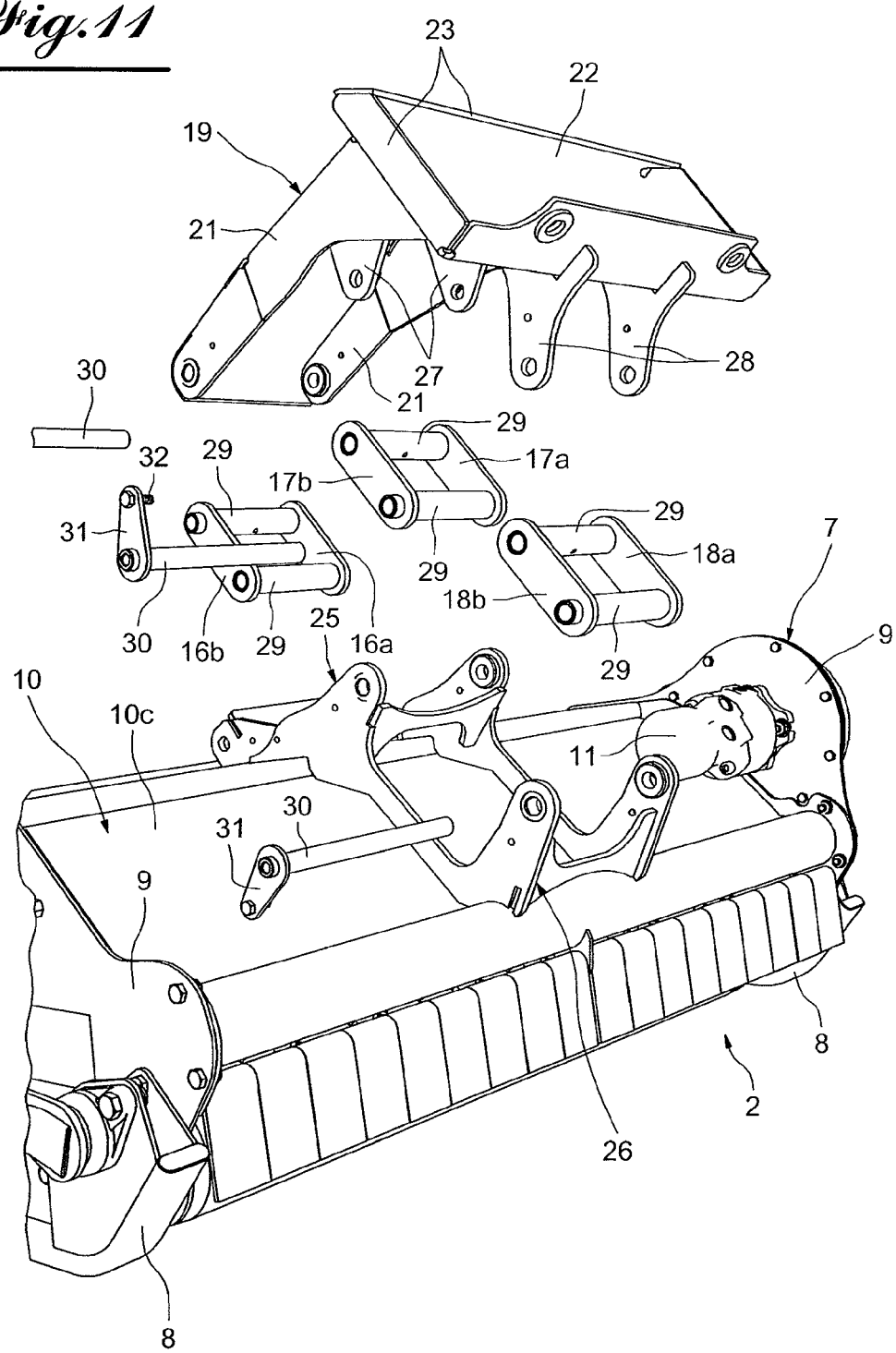
FIG. 11 is an exploded perspective view of the suspension mechanism of the invention between the support arm and the soil treatment machine.

As better emerges from FIGS. 6, 9 and 11, the connecting rods 16a, 16b; 17a, 17b; 18a, 18b of each pair 16, 17, 18 are twinned by two parallel hollow cylindrical pins 29 respectively fixed to the two ends of the two connecting rods of each pair. The pairs of connecting rods 16, 17, 18 are pivotingly fastened to the fork joints 24, 25, 26 of the hood 7 and to the fork joints 27, 28 as well as to the side walls 21 of the bracket 19 by rigid cylindrical pins 30, only some of which are visible in FIG. 11, passing through the fork joints 24, 25, 26, 27, 28 and the side walls 21 as well as the hollow pins or tubes 29 of the pairs of connecting rods 16, 17, 18. Each pin 30 comprises, integral with one of its ends, a radial lug 31 able to be fastened to one of the wings of each fork joint 24-28 and one of the side walls 21 of the bracket 19 by a fastening screw 32 in order to axially maintain the connecting rod 30 at these fork joints and side walls 21.

Figure 7:
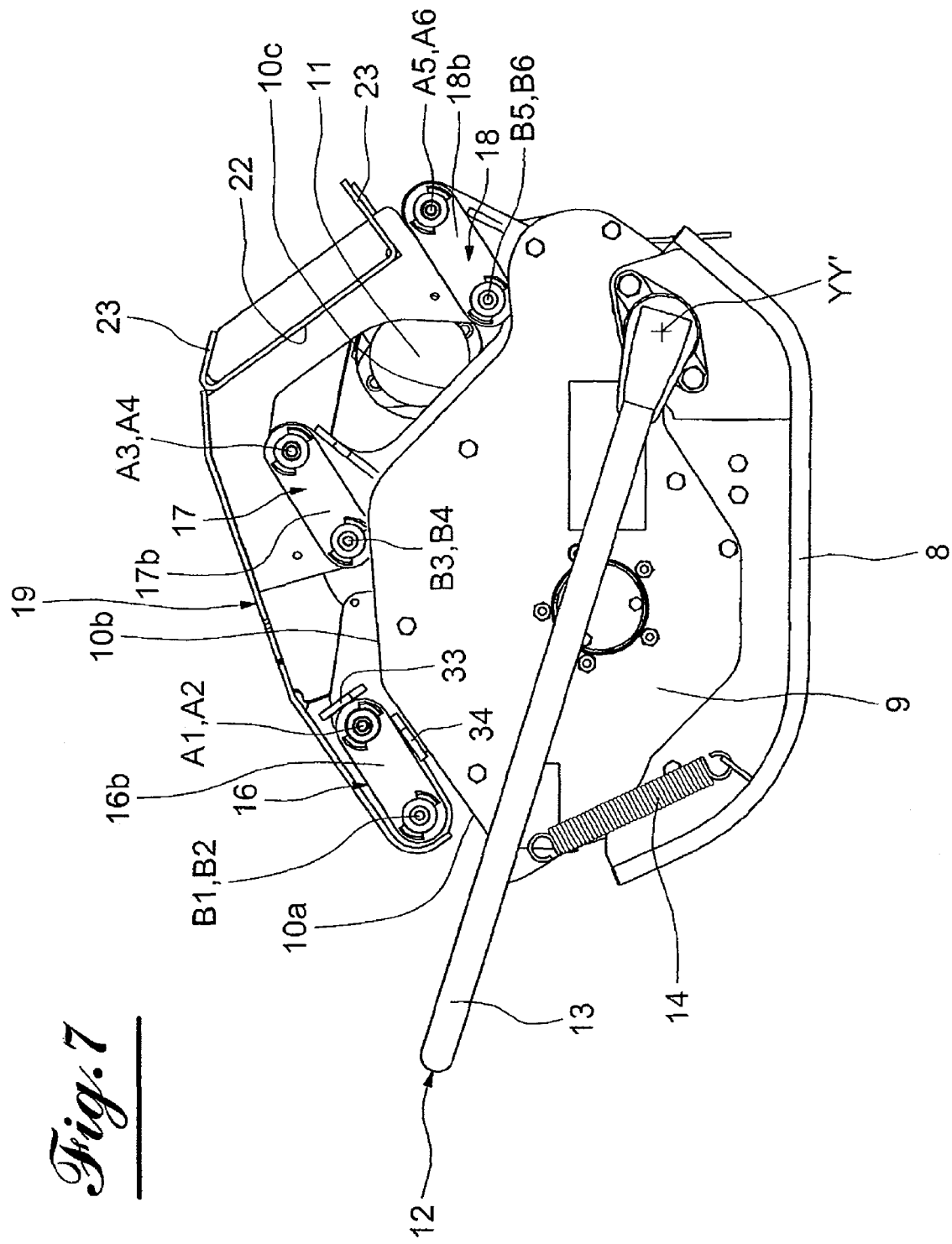
FIG. 7 is a side view along arrow VII of FIG. 5, without the side wall of the support arm.
Figure 8:
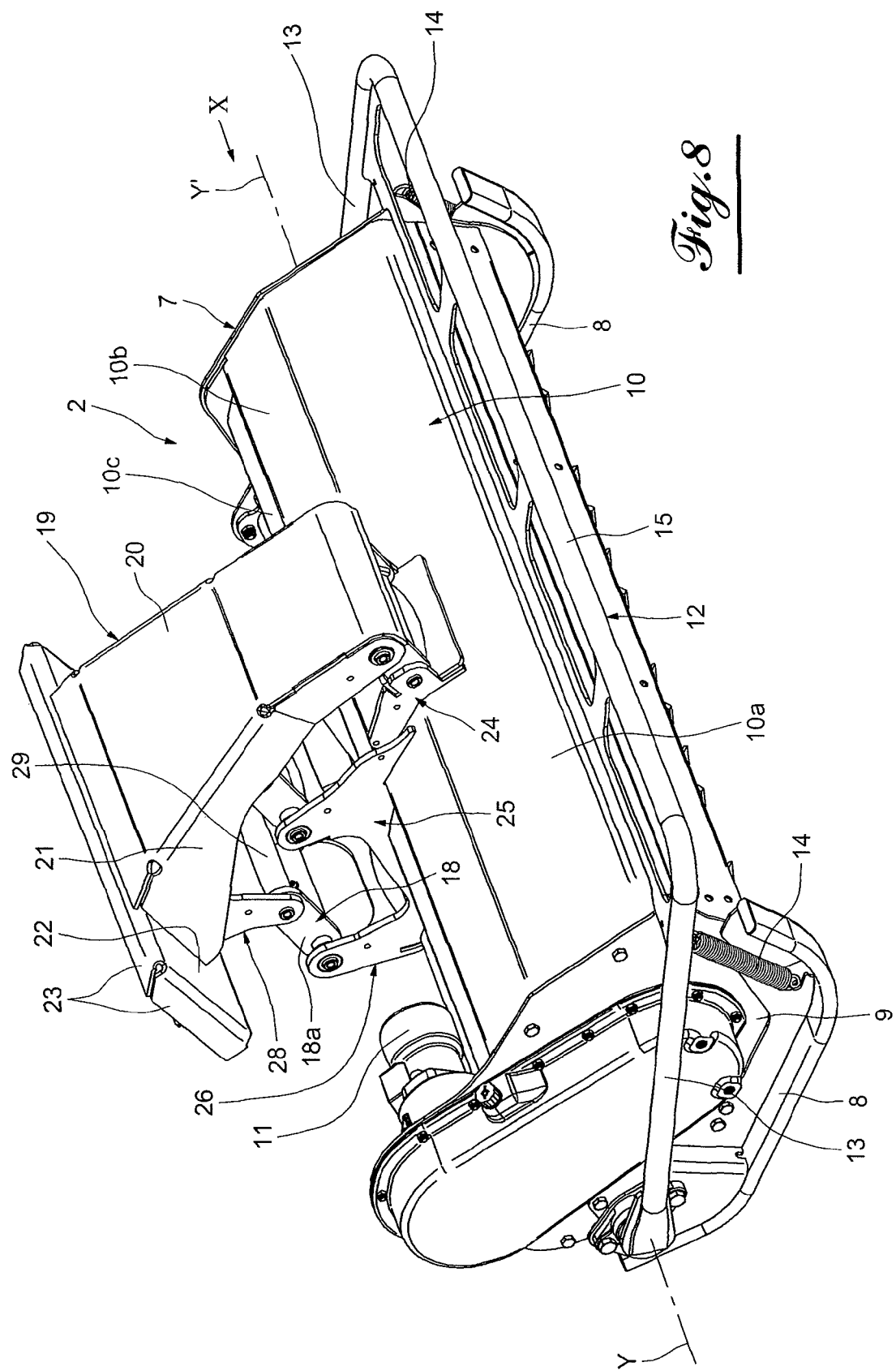
FIG. 8 is a perspective view similar to that of FIG. 5 and illustrating the soil treatment machine in its lowest position in relation to the support arm.
Figure 10:
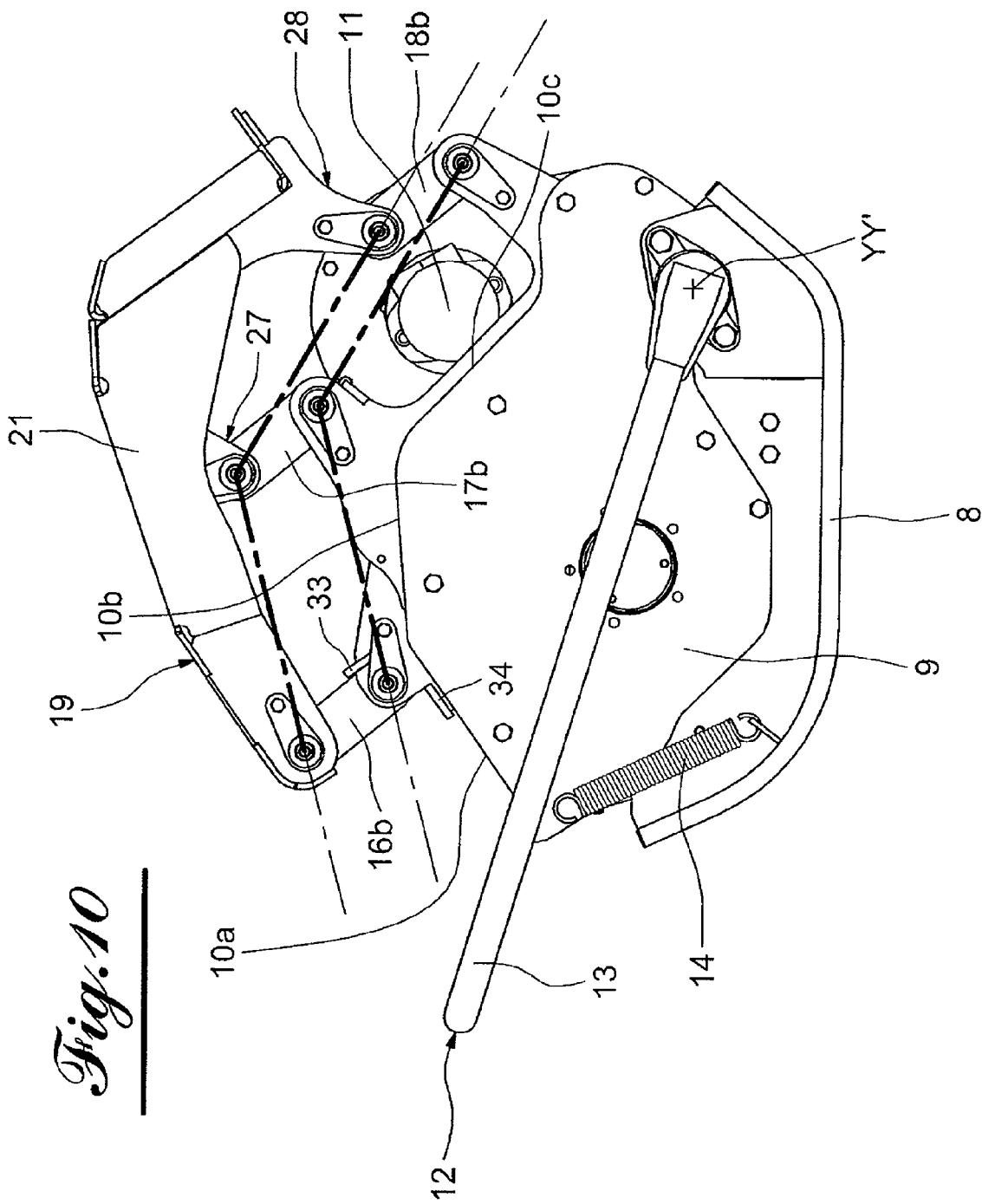
FIG. 10 is a side view along arrow X of FIG. 8 without the side wall of the support arm.

The hood 7 of the machine 2 comprises at least two stops 33, 34 making it possible to limit the pivoting of the pairs of connecting rods 16, 17, 18 to their extreme positions respectively corresponding to the lowest and highest positions of the machine 2 relative to the support bracket 19 and which are illustrated in particular in FIGS. 7 and 10. In order to limit the pivoting of the connecting rods to their position corresponding to the lowest position of the machine 2 relative to the bracket 19 and illustrated in particular in FIGS. 9, 10, a single stop 33 may be made integral between the two wings of the fork joint 24 transverse thereto, such that the two connecting rods 16a, 16b bear on the stop 33 in this low position of the machine. The stop 33 can be formed by a rigid rectangular plate. In order to limit the pivoting of the connecting rods to their position corresponding to the highest position of the machine 2 relative to the bracket 19, a single stop 34 can be provided, for example in the form of a rigid plate, while being made integral with the flat front wall 10a of the wall 10 of the hood 7.

Figure 5:
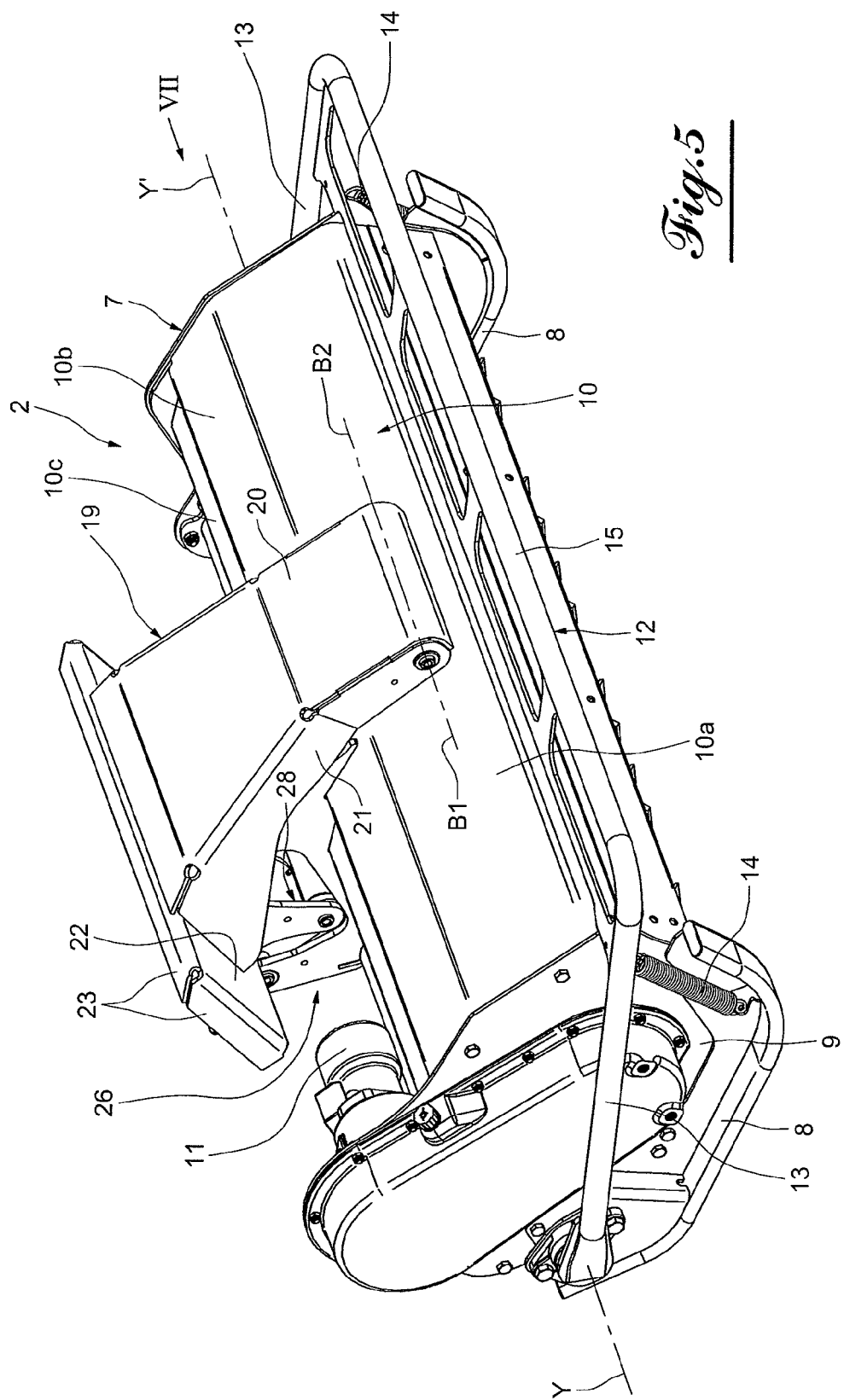
FIG. 5 is a perspective view of the soil treatment machine according to the invention and occupying its highest position relative to a support arm of the traction vehicle.

The unaligned position of the hinge pins of the pairs of connecting rods between the machine 2 and the support bracket 19 allows the external profile of the hood 7 of the machine 2 to partially fit that of the support bracket 19 in the highest position of the machine 2, as illustrated in particular in FIG. 5, by retracting a large portion of the articulation rods into the bracket 19.

Various alternative embodiments can be made to the suspension mechanism without going beyond the scope of the present invention.

Thus, it is possible to provide only three connecting rods in place respectively of the three pairs of connecting rods previously described in order to form a single deformable parallelogram made up of two of the connecting rods while the third connecting rod, parallel to the other two, will contribute to the deformation of the parallelogram on either side of its closing plane without breaking this parallelogram. These three connecting rods will be arranged in a same plane perpendicular to the pivot axis Y-Y' of the hoop 12 coinciding with the median longitudinal vertical plane of the vehicle when the machine 2 is hitched to the vehicle.

Moreover, the articulations of the connecting rods between the support bracket 19 and the hood 7 of the machine 2 can be formed by ball and socket joints allowing the machine 2 to also move transversely to the direction of movement of the vehicle 1 following the irregularities of the ground, the connecting rods of course ensuring the vertical displacement of the machine 2 relative to the support bracket 19, as already previously explained.

Lastly, the suspension mechanism of the invention can also operate to maintain an open parallelogram configuration on either side of its closing plane by using at least a fourth additional connecting rod, or more additional connecting rods parallel to the connecting rods forming the deformable parallelogram(s) and having the same length as the latter parts.

The suspension mechanism according to the invention has an extremely compact structure since it requires relatively short connecting rods in relation to the connecting rods of the known mechanism for a same vertical displacement amplitude of the soil treatment machine following the irregularities of the ground on which it is moving. The mechanism of the invention also ensures excellent guiding of the vertical movements of the treatment machine 2 relative to the support arm 4 and allows the machine 2 to follow the height differences of the ground without the user needing to vary the height of the fastening arm 4. Lastly, the vehicle has been described as being able to push the soil treatment machine forward, but this vehicle can also pull the soil treatment machine backward.

The invention claimed is:

1. An assembly comprising:
 a soil treatment machine having a hood covering a soil treatment tool;
 a traction vehicle having a fixed support arm connected to the soil treatment machine, the traction vehicle driving the soil treatment machine across ground, wherein the fixed support arm includes a bracket at a distal end of the fixed support arm; and
 a connecting mechanism connecting the bracket of the fixed support arm to the hood of the soil treatment machine so that the soil treatment machine can move vertically relative to the fixed support arm in response to unevenness of the ground over which the soil treatment machine is driven, wherein
 the connecting mechanism comprises first, second, and third pairs of connecting rods, each of the connecting rods having the same length, between opposite first and second ends of the connecting rod, the first, second, and third pairs of connecting rods being articulated at the first ends of the connecting rods to the hood and at the second ends of the connecting rods to the bracket, and
 when viewed perpendicular to the connecting rods, the first, second, and third pairs of connecting rods are articulated to the hood and to the bracket so that the first pair and the second pair of connecting rods define a first parallelogram, and the second pair and the third pair of the connecting rods define a second parallelogram, the first and second parallelograms being deformable by articulation of the first, second, and third pairs of connecting rods with respect to the hood and the bracket, while maintaining parallelogram shapes, on both sides of first and second closing first and second axes of the first and second parallelogram, at which adjacent sides of the first and second parallelograms, respectively, are co-linear, during vertical movement of the soil treatment machine relative to the fixed support arm of the traction vehicle.

2. The assembly according to claim 1, wherein the soil treatment machine is removably fastened to the support arm of the traction vehicle, in front of the traction vehicle, for pushing the soil treatment machine forward or pulling the soil treatment machine backward.

3. The assembly according to claim 1, wherein the soil treatment machine comprises first and second side blocks for movement of the soil treatment machine by sliding on the ground.

4. The assembly according to claim 1, wherein the hood of the soil treatment machine comprises first and second stops limiting articulation of at least one of the connecting rods, of the first, second, and third pairs of connecting rods, at maximum and minimum separations, respectively, of the hood of the soil treatment machine relative to the bracket.

5. The assembly according to claim 1, wherein each of the first, second, and third pairs of connecting rods includes a left connecting rod and a right connecting rod and the left connecting rods of the first, second, and third pairs of connecting rods lie in a first common plane, and the right connecting rods of the first, second, and third pairs of connecting rods lie in a second common plane.

6. The assembly according to claim 5, wherein the first common plane and the second common plane are vertical and lie on opposite sides of and are symmetrical with respect to a vertical plane parallel to direction of movement of the traction vehicle.

7. The assembly according to claim 6, wherein the vertical plane parallel to the direction of movement of the traction vehicle contains a longitudinal axis of the traction vehicle.

8. The assembly according to claim 1, wherein
 the first, second, and third pairs of connecting rods are hingedly connected at the first ends of the connecting rods to the hood by first, second, and third pins, respectively, the first, second, and third pins being transverse to direction of movement of the traction vehicle, and
 the second ends of the connecting rods of the first, second, and third pairs of connecting rods are hingedly connected to the bracket by fourth, fifth, and sixth pins, respectively, the fourth, fifth, and sixth pins being transverse to the direction of movement of the traction vehicle.

9. The assembly according to claim 1, wherein
 the bracket has a lower profile at least partially corresponding to a profile of a non-planar wall of the hood of the soil treatment machine, and
 the first, second, third, fourth, fifth, and sixth pins and the first, second, and third pairs of connecting rods are arranged so that, in the closest position of the hood to the bracket, the bracket at least partially receives the non-planar wall of the hood.

10. The assembly according to claim 9 including first, second, and third fork joints mounted on the hood, wherein the first, second, and third pins engage the fork joints and the first ends of the connecting rods of the first, second, and third pairs of connecting rods.

* * * * *